United States Patent
Ghaisas et al.

(10) Patent No.: US 10,095,478 B2
(45) Date of Patent: Oct. 9, 2018

(54) COMPUTER IMPLEMENTED SYSTEM AND METHOD FOR IDENTIFYING PROJECT REQUIREMENTS

(71) Applicant: Tata Consultancy Services Limited, Mumbai (IN)

(72) Inventors: Smita Ghaisas, Pune (IN); Preethu Rose Anish, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/229,993

(22) Filed: Aug. 5, 2016

(65) Prior Publication Data
US 2017/0046131 A1 Feb. 16, 2017

(30) Foreign Application Priority Data
Aug. 10, 2015 (IN) .......................... 3029/MUM/2015

(51) Int. Cl.
*G06F 9/44* (2018.01)
*G06F 8/10* (2018.01)
*G06F 8/20* (2018.01)

(52) U.S. Cl.
CPC . *G06F 8/10* (2013.01); *G06F 8/20* (2013.01)

(58) Field of Classification Search
CPC ..................................... G06F 8/10; G06F 8/20
See application file for complete search history.

(56) References Cited

U.S. PATENT DOCUMENTS

| | | | |
|---|---|---|---|
| 7,346,533 B1 * | 3/2008 | Creel ..................... | G06Q 10/06 705/7.17 |
| 8,538,767 B1 | 9/2013 | Hemmat | |
| 2005/0096937 A1 * | 5/2005 | Subash ..................... | G06F 8/10 717/104 |

(Continued)

OTHER PUBLICATIONS

Hidalgo et al.; "Functional Requirements Identification Using Item-to-Item Collaborative Filtering" International Journal of Information and Education Technology, IJIET, vol. 5, No. 10, pp. 758-762, 2015 http://www.ijiet.org/papers/606-D028.pdf.

*Primary Examiner* — Viva Miller
(74) *Attorney, Agent, or Firm* — Finnegan, Henderson, Farabow, Garrett & Dunner LLP

(57) ABSTRACT

A system(s) and method(s) for identifying project requirement are described herein. The system identifies the architecturally significant functional requirements from the functional requirements from a client/customer. The system further classifies the identified architecturally significant functional requirements into specific classes based on the architectural impact they may have on the project. Subsequently, the system generates a meta schema related to architecturally significant functional requirements based on the classification of architecturally significant functional requirements and pre-defined schema. Thereafter, system recommends the specific probing questions from the bank of probing questions to unearth unspecified or underspecified architecturally relevant information based on the generated meta schema. The system further recommends architectural solutions selected from a bank of architectural solutions based on answers received for specific probing questions in response to the architectural impact they may have on the project.

8 Claims, 2 Drawing Sheets

(56) References Cited

U.S. PATENT DOCUMENTS

| | | |
|---|---|---|
| 2006/0174222 A1 | 8/2006 | Thonse et al. |
| 2008/0040704 A1* | 2/2008 | Khodabandehloo ...... G06F 8/73 717/105 |
| 2013/0054285 A1* | 2/2013 | Oberhofer .............. G06Q 10/00 705/7.11 |
| 2013/0205190 A1 | 8/2013 | Kossmann et al. |

* cited by examiner

COMPUTER IMPLEMENTED SYSTEM AND METHOD FOR IDENTIFYING PROJECT REQUIREMENTS

PRIORITY CLAIM

This U.S. patent application claims priority under 35 U.S.C. § 119 to: India Application No. 3029/MUM/2015 filed on 10 Aug., 2015. The entire contents of the aforementioned application are incorporated herein by reference.

TECHNICAL FIELD

The present invention relates to a system and method for identifying project requirements in a computing environment.

BACKGROUND

Traditionally, the development, deployment and subsequent customization cost of even moderately complex software is significantly high. One of the primary contributors to the high cost of software development is associated with lack of adequate documentation of customer requirements. Further, a requirement document typically includes functional and non-functional requirements (NFRs), respectively describing what the system needs to do and how it is to be achieved.

Since, the skills needed for identifying functional requirements are different than those needed for identifying architectural solutions, the requirement engineering exercise is often carried out by different teams in a project. For example, functional requirements are collected and documented by business analysts and domain experts. But the architectural solutions related to requirements are identified/suggested by technology experts. As a result, the knowledge bank for functional requirements, and architectural solutions are maintained separately.

However, this may not be as simple as it looks, for example, some functional requirements statements may carry an architectural impact. The kind of impact they may have on architecture is typically not explicitly stated in the functional requirement statement and may be difficult to identify from a given set of functional requirements. Furthermore, the business analysts, who are collecting functional requirements, may not have the requisite technical knowledge to infer and articulate the architectural impact from the functional requirements that they capture from customers. They may not be technically equipped to ask right questions to the customer to unearth the architectural impact.

Failure to identify and analyze architecturally significant functional requirements early in the life cycle of a project may result in costly rework at later stages of software development. For example, "ability to receive notification whenever transaction is made" is a functional requirement which carries an architectural impact. This functional requirement explicitly does not state the mode through which a notification is to be made i.e. email notification or real time notification with an ability to subscribe to topic of interest. If notification is to be made using email, a simple event-driven architecture would suffice. However, for real time notification with an ability to subscribe to topic of interest a different architecture (e.g.—publish-subscribe) is required. Thus, identifying the architecturally significant functional requirements from the pool of functional requirements is difficult.

Therefore, there is a need for a system that identifies the architecturally significant functional requirements and recommend probing questions and architectural solutions to unearth architectural impact.

SUMMARY

Embodiments of the present disclosure present technological improvements as solutions to one or more of the above-mentioned technical problems recognized by the inventors in conventional systems.

Some of the objects of the present disclosure aimed to ameliorate one or more problems of the prior art or to at least provide a useful alternative include providing a system which automatically identifies architectural significant functional requirements from functional requirements; providing a system for identifying project requirements including a bank of probing questions to produce a more complete requirement specification; and providing a system for identifying project requirements which automatically recommends a selection of possible architectural solutions based on the architectural impact.

In an embodiment, method(s) and system(s) to identify project requirements is disclosed. The method includes identifying architecturally significant functional requirements from functional requirements based on keywords and phrases learnt during training phases. The method further includes, classifying the architecturally significant functional requirements into specific architecturally significant functional requirement classes based on the architectural impact they may have on the project. Furthermore, the method includes generating a meta schema based on the classification of the architecturally significant functional requirements and a predefined schema. Thereafter, the method further includes providing probing questions from a bank of probing questions for the architecturally significant functional requirements based on the generated meta schema, and is further configured to recommend architectural solutions selected from a bank of solutions corresponding to the answers provided for specific probing questions based on the generated meta schema.

In another embodiment, there is provided a computer program product comprising a non-transitory computer readable medium having a computer readable program embodied therein, wherein the computer readable program, when executed on a computing device, causes the computing device to: store predetermined set of rules and pre-defined schema; receive the predetermined set of rules and generate system processing commands; receive a plurality of functional requirements from a client/customer for a project; identify architecturally significant functional requirements from the plurality of functional requirements based on keywords and phrases learnt during training phases; classify the architecturally significant functional requirements into specific architecturally significant functional requirement classes having a one or more architectural impact on the project; generate a meta schema related to architecturally significant functional requirements based on the classification of the architecturally significant functional requirements and the pre-defined schema; provide probing questions selected from a bank of probing questions for the architecturally significant functional requirements; and recommend architectural solutions selected from a bank of solutions corresponding to the answers provided for specific probing question based on the generated meta schema.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to a system and a method for identifying project requirements.

A computer implemented system and method for identifying project requirements will now be described with reference to the embodiment shown in the accompanying drawing. The embodiment does not limit the scope and ambit of the disclosure. The description relates purely to the examples and preferred embodiments of the disclosed system and its suggested applications.

According to an implementation, the present disclosure envisages a computer implemented system and method for identifying project requirements. The system stores predetermined set of rules and a pre-defined schema. Further, the system generates system processing commands based on the predetermined set of rules. The system identifies architecturally significant functional requirements from the functional requirements given by a client/customer for a project based on keywords and phrases learnt during training phase. Further, the system classifies the architecturally significant functional requirements into specific architecturally significant functional requirement classes, wherein these classes determine the kind of one or more architectural impact they may have on the project. Further, the system generates a meta schema related to the architecturally significant functional requirements, based on the classification of the architecturally significant functional requirements and the pre-defined schema. The pre-defined schema is defined during the training phase, wherein the pre-defined schema may contain a bank of probing questions and a bank of answers to the probing questions and depending on the answers one or more architectural solutions, corresponding to the architecturally significant functional requirement classes. Subsequently, the system selectively identifies probing questions from the probing question bank for the architecturally significant functional requirements based on the generated meta schema related to the architecturally significant functional requirements. Thereafter, the system recommends and displays architectural solutions corresponding to the answers provided for the specific probing questions based on the generated meta schema.

Figure 1:
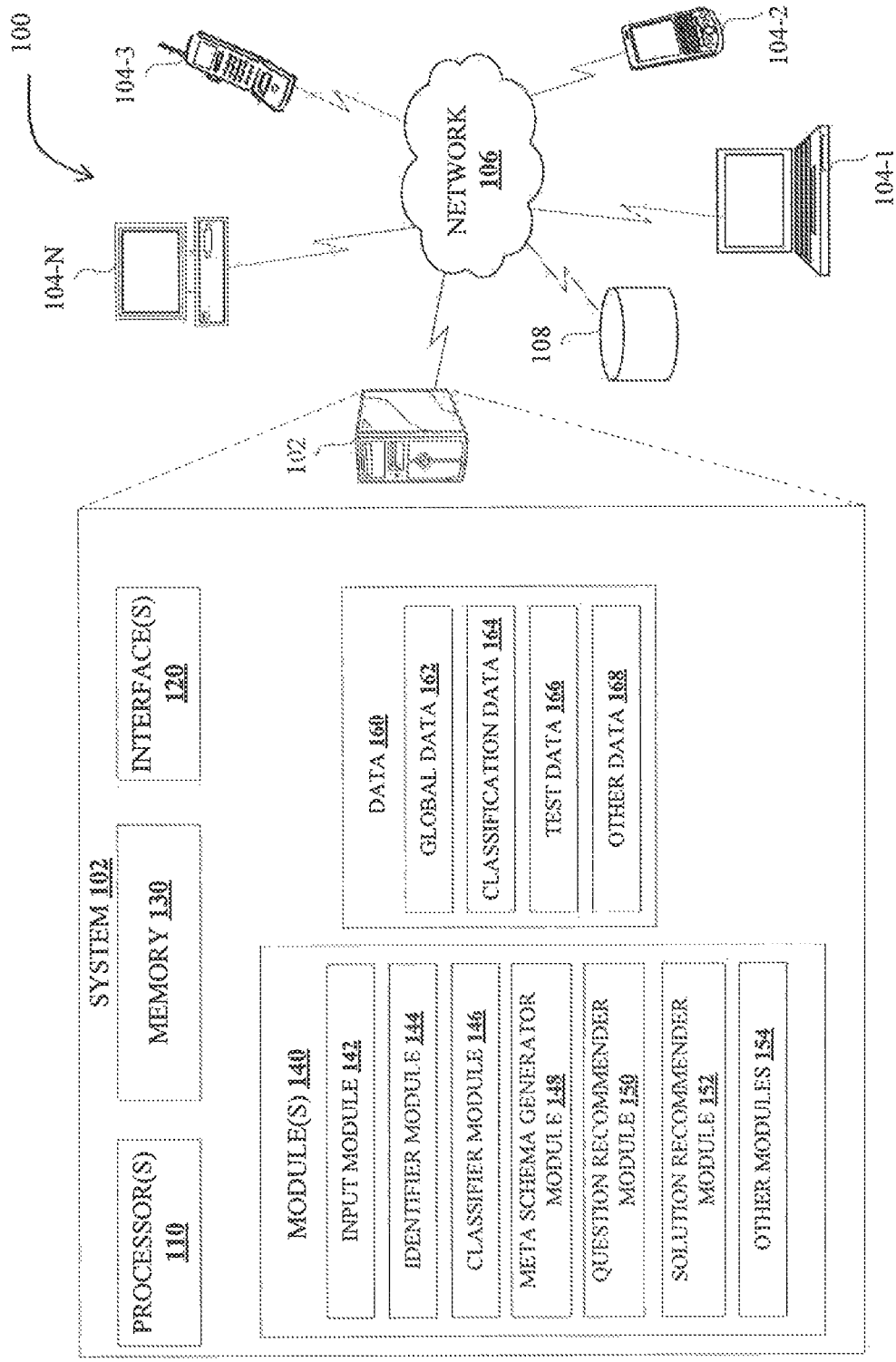
FIG. 1 illustrates a network implementing a system for identifying project requirements, according to an implementation of the present disclosure.
Figure 2:
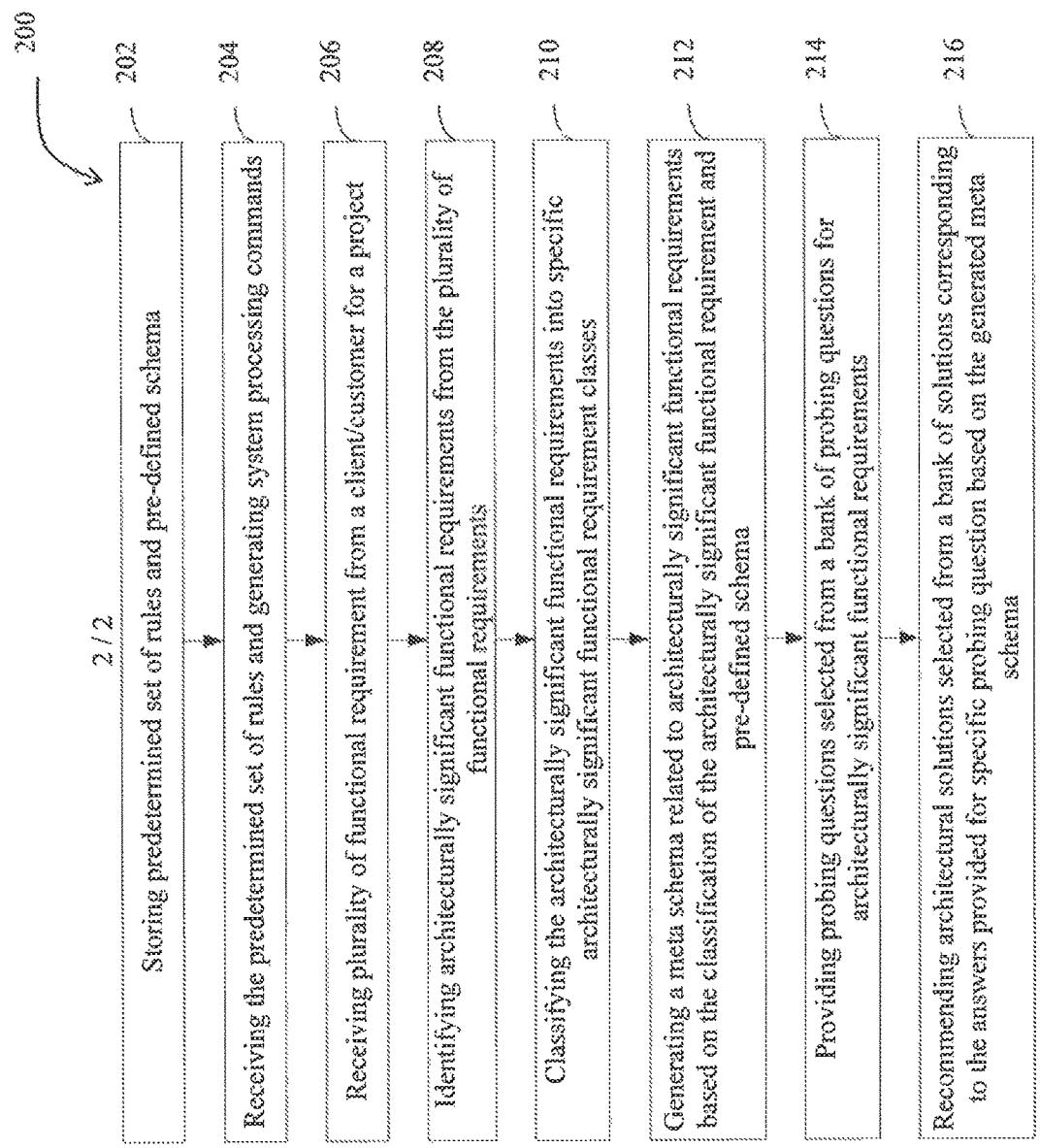
FIG. 2 illustrates a method for identifying project requirements, according to an implementation of the present disclosure.

Referring now to the drawings, and more particularly to FIGS. 1 through 2, where similar reference characters denote corresponding features consistently throughout the figures, there are shown preferred embodiments and these embodiments are described in the context of the following exemplary system and method.

FIG. 1 illustrates a network implementation of a system 102 for identifying project requirements. The system 102 can be implemented as a variety of communication devices, such as a laptop computer, a notebook, a workstation, a mainframe computer, a server and the like. The system 102 described herein, can also be implemented in any network environment comprising a variety of network devices, including routers, bridges, servers, computing devices, storage devices, etc.

In one implementation, the system 102 is connected to one or more devices 104-1, 104-2 . . . 104-N, individually and commonly hereinafter referred to as device(s) 104, and a database 108, through a network 106. The devices 104 may be implemented as, but are not limited to, hand-held devices, laptops or other portable computers, tablet computers, mobile phones, personal digital assistants (PDAs), Smartphone, and the like. The devices 104 may be located within the vicinity of the system 102 or may be located at different geographic locations. Further, the devices 104 may themselves be located either within the vicinity of each other, or may be located at different geographic locations.

The network 106 may be a wireless or a wired network, or a combination thereof. The network 106 can be a collection of individual networks, interconnected with each other and functioning as a single large network (e.g., the internet or an intranet). The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

In one implementation, the system 102 includes memory 130. The memory 130 may be coupled to processor(s) 110. The memory 130 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 130 is configured to store predetermined set of rules and a pre-defined schema. The pre-defined schema is defined during training phases, wherein the pre-defined schema may contain a bank of probing questions and a bank of architectural solutions to the probing questions, corresponding to the architecturally significant functional requirement classes. In an embodiment, the architecturally significant functional requirement classes are identified wherein each class specifies the kind of architectural impact they may have on the project. In an exemplary embodiment, wherein the class related to architecturally significant functional requirement is identified as "communication", the system further provides probing questions to identify the architectural impact such as "What mode of alert is needed? Is it real time or email or SMS?". If the client/customer provides an answer as "real time" then the system recommends "publish-subscribe" architectural solution.

In one implementation, the system 102 may also include processor(s) 110. The processor 110 is coupled with the memory 130 to receive the pre-determined set of rules and further configured to generate system processing commands. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in a memory.

The functions of the various elements shown in the figure, including any functional blocks labeled as "processor(s)", may be provided through the use of dedicated hardware as well as hardware capable of executing embedded or coded software in association. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

Also, the system 102 includes interface(s) 120. The interfaces 120 may include a variety of software and hardware interfaces that allow the system 102 to interact with the entities of the network 106, or with each other. The interfaces 120 may facilitate multiple communications within a wide variety of networks and protocol types, including wire networks, for example, LAN, cable, etc., and wireless networks, for example, WLAN, cellular, satellite-based network, etc.

The system 102 further includes a data repository 160. Further, the data repository 160 may include global data 162, classification data 164, test data 166 and other data 168. The other data 168, amongst other things, may serve as a repository for storing data that is processed, received, or generated as a result of the execution of one or more modules in the modules 140. In an implementation, the global data 162 refers to all the data related to plurality of processes executed by the system 102. In an implementation, the classification data 164 refers to all the data required for the classification of the architecturally significant functional requirements. In an implementation, the test data 166 refers to all the data related to the testing phase, which may contain permutation and combination of data to test different modules by the system.

Further, the system 102 includes module(s) 140. In an implementation, the module(s) 140 may include an input module 142, an identifier module 144, a classifier module 146, a meta schema generator module 148, a question recommender module 150, a solution recommender module 152 and other module(s) 154. The other module(s) 154 may include an updation module to update the schema and programs or coded instructions that supplement applications or functions performed by the system 102.

According to the one implementation, the input module 142 is coupled with the processor 110 to receive system processing commands and is configured to receive a plurality of functional requirements from a client/customer for a project. In an embodiment, the functional requirements given by the client/customer contain the functional requirements which have implicit architectural impact and the functional requirements which don't have architectural impact.

According to the present implementation, the identifier module 144 is coupled with the processor 110 and is configured to identify architecturally significant functional requirements from the plurality of functional requirements based on the keywords and phrases learnt during the training phases.

In one embodiment, the training phase includes pre-processing of test functional requirements for identifying the architecturally significant functional requirements. The pre-processing involves removing stop words that do not provide any relevant information on the statement's lexical content (for example conjunctions and prepositions). The statements are then reduced into a set of keywords. The keywords are reduced to their stemmed forms using algorithms like Lovin's stemming algorithm to reduce all words with the same roots to a common form. These stemmed words extracted from the test requirement statements are used for training the first identifier module 144.

According to the present implementation, the classifier module 146 is coupled with the processor 110 to receive system processing commands and is configured to classify the architecturally significant functional requirements into specific architecturally significant functional requirement classes based on the kind of architectural impact they may have on the project. In an exemplary embodiment, the classifier module 146 classifies the architecturally significant functional requirement such as "Delivering specific communications in other languages" in "Localization" architecturally significant functional requirement class. Similarly, another architecturally significant functional requirement "The system must record every modification to customer records for audit purposes." will be classified in "Audit Trail" architecturally significant functional requirement class by the classifier module 146.

In an embodiment, the classes are identified by the system wherein each class specifies the kind of architectural impact they may have on the project. In an exemplary embodiment, there are different classes like: audit trail, batch processing, localization, communication, payment, print, report, search, third party interaction, workflow, online help and licensing, and so on.

In another embodiment, the classification of architecturally significant functional requirements is based on a set of keywords and phrases learnt during the training phase. The architecturally significant functional requirements are pre-processed to remove stop words which do not provide any relevant information on the lexical content of the statement. The architecturally significant functional requirements are further reduced to a set of keywords. The keywords are further reduced to their stemmed form using the algorithms such as Lovin's stemming algorithm, to reduce all the words with the same roots to a common form, usually stripping each word of its derivational and inflectional suffixes. Further, these common form words are used to train the classifiers like Multinomial Naive Bayes Classifier, which is used for classification of architecturally significant functional requirements.

In one another embodiment, where architectural significant functional requirements does not fall in any of the architecturally significant functional requirement classes, the classifier module 146 may generate a new class to accommodate the architectural significant functional requirements.

According to the present implementation, the meta schema generator module 148 is coupled with the processor 110 to receive the system processing commands and configured to generate a meta schema related to the architecturally significant functional requirements based on the classification of the architecturally significant functional requirements and the pre-defined schema.

According to the present implementation, the question recommender module 150 is coupled with the processor to receive system processing commands and is configured to provide probing questions selected from a bank for the architecturally significant functional requirements based on the generated meta schema related to the architecturally significant functional requirements. In an exemplary embodiment these probing questions are provided to an analyst so that, the analyst can ask these questions to the client for producing more complete requirement specifications and unearth the architectural impact of the architecturally significant functional requirements.

In another embodiment, the bank of probing questions are pre-stored in the system in various domains like banking, financial services and insurance, healthcare, retail, government, telecommunications, airline management and other domains.

According to the present implementation, the solution recommender module 152 is coupled with the processor 110 to receive system processing commands and is configured to recommend architectural solutions based on the answers received for the specific probing questions. The solution recommender module 152 recommends the architectural solutions based on the generated meta schema.

In an embodiment, the architectural solutions are created by the system architecture experts practicing in various domains.

FIG. 2 illustrates a method 200 for identifying project requirements according to an embodiment of the present disclosure. The method 200 may be described in the general context of computer executable instructions. Generally, computer executable instructions include routines, programs, objects, components, data structures, procedures, and modules, functions, which perform particular functions or implement particular abstract data types. The method 200 can also be practiced in a distributed computing environment where functions are performed by remote processing devices that are linked through a communication network. In a distributed computing environment, computer executable instructions are located in both local and remote computer storage media, including memory storage devices.

The order in which the method 200 is described is not intended to be construed as a limitation, and any number of the described method blocks can be combined in any order to implement the method 200, or an alternative method. Additionally, individual blocks may be deleted from the method 200 without departing from the spirit and scope of the method described herein. Furthermore, the method 200 can be implemented in any suitable hardware, software, firmware, or combination thereof.

Referring to method 200, at block 202, predetermined set of rules and pre-defined schema is stored. In an implementation, the predetermined set of rules and pre-defined schema is stored in the memory 130.

At block 204, predetermined set of rules are received and system processing commands are generated. In an implementation, the processor 110 is configured to receive the predetermined set of rules and generate system processing commands.

At block 206, a plurality of functional requirements from a client/customer for a project is received. In an implementation, the input module 142 receives the requirements from the client/customer for a project.

At block 208, architecturally significant functional requirements are identified from the received functional requirements, based on keywords and phrases learnt during training phases. In an implementation the identifier module 144 identifies the architecturally significant functional requirements based on the keywords and phrases.

At block 210, the identified architecturally significant functional requirements are classified into specific architecturally significant functional requirements classes stating the different kind of architectural impact they may have on the project. In an implementation, the classification of the architecturally significant functional requirements is done by the classifier module 146.

At block 212, a meta schema related to architecturally significant functional requirements is generated based on the classification of the architecturally significant functional requirements and the pre-defined schema. In an implementation, the meta schema generator module 148 generates the meta schema based on the classification of the architecturally significant functional requirements and the pre-defined schema.

At block 214, specific probing questions are provided from the bank of probing questions for the architecturally significant functional requirements. In an implementation, a question recommender module 150 provides the probing questions selected from said bank.

At block 216, specific architectural solutions are recommended based on the answers to the probing questions, based on the generated meta schema. In an implementation, the architectural solutions to the specific probing questions are recommended by the solution recommender module 152.

The technical advancements of the system envisaged by the present disclosure include the realization of: a system and method for identifying project requirements which identifies the architectural significant functional requirements; a system and method for identifying project requirements which recommends questions to produce a more complete requirement specification; and a system and method for identifying project requirements which recommends possible architectural solutions to the architectural impact.

The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof.

The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A system for identifying project requirements in a computing environment, the system comprising:
    a memory configured to store a predetermined set of rules and a pre-defined schema;
    a processor coupled with the memory to receive the predetermined set of rules and further configured to generate system processing commands;
    an input module coupled with the processor and configured to receive a plurality of functional requirements from a client/ customer for a project;
    an identifier module coupled with the processor and configured to identify architecturally impacting functional requirements from the plurality of functional requirements based on keywords and phrases learnt during training phases;
    a classifier module coupled with the processor and configured to classify the architecturally impacting functional requirements into specific architecturally impacting functional requirement classes having one or more architectural impact on the project;
    a meta schema generator module coupled with the processor and the memory to receive the pre-defined schema and, configured to generate a meta schema related to architecturally impacting functional requirements, based on the classification of the architecturally impacting functional requirements and the pre-defined schema;
    a question recommender module coupled with the processor, configured to provide probing questions selected from a bank of probing questions for the architecturally impacting functional requirements based on the generated meta schema to unearth unspecified or underspecified architecturally relevant information related to the architecturally impacting functional requirements in an initial stage of the project; and
    a solution recommender module coupled with the processor, configured to recommend architectural solutions selected from a bank of solutions corresponding to answers provided for specific probing question based on the generated meta schema.

2. The system as claimed in claim 1, wherein the pre-defined schema comprises the bank of probing questions and the bank of architectural solutions corresponding to the probing questions, further corresponding to the architecturally impacting functional requirement classes.

3. A method for identifying project requirements in a computing environment, the method comprising:
    storing a predetermined set of rules and a pre-defined schema;
    receiving the predetermined set of rules and generating system processing commands;
    receiving a plurality of functional requirements from a client/ customer for a project;
    identifying architecturally impacting functional requirements from the plurality of functional requirements based on keywords and phrases learnt during training phases;

classifying the architecturally impacting functional requirements into specific architecturally impacting functional requirement classes having one or more architectural impact on the project;

generating a meta schema related to architecturally impacting functional requirements based on the classification of the architecturally impacting functional requirements and the pre-defined schema;

providing probing questions selected from a bank of probing questions for the architecturally impacting functional requirements based on the generated meta schema, to unearth unspecified or underspecified architecturally relevant information, in an initial stage of the project; and recommending architectural solutions selected from a bank of solutions corresponding to answers provided for specific probing question based on the generated meta schema.

4. The method as claimed in claim 3, wherein the pre-defined schema comprises the bank of probing questions, a bank of answers and the bank of architectural solutions corresponding to the probing questions depending on the answers, further corresponding to the architecturally impacting functional requirement classes.

5. A computer program product comprising a non-transitory computer readable medium having a computer readable program embodied therein, wherein the computer readable program, when executed on a computing device, causes the computing device to:

store a predetermined set of rules and a pre-defined schema;

receive the predetermined set of rules and generate system processing commands;

receive a plurality of functional requirements from a client/customer for a project;

identify architecturally impacting functional requirements from the plurality of functional requirements based on keywords and phrases learnt during training phases;

classify the architecturally impacting functional requirements into specific architecturally impacting functional requirement classes having a one or more architectural impact on the project;

generate a meta schema related to architecturally impacting functional requirements based on the classification of the architecturally impacting functional requirements and the pre-defined schema;

provide probing questions selected from a bank of probing questions for the architecturally impacting functional requirements based on the generated meta schema, to unearth unspecified or underspecified architecturally relevant information, in an initial stage of the project; and recommend architectural solutions selected from a bank of solutions corresponding to answers provided for specific probing question based on the generated meta schema.

6. The system of claim 1, wherein the architecturally impacting functional requirement classes comprise audit trail, batch processing, localization, communication, payment, print, report, search, third party interaction, workflow, online help and licensing.

7. The method of claim 3, wherein the architecturally impacting functional requirement classes comprise audit trail, batch processing, localization, communication, payment, print, report, search, third party interaction, workflow, online help and licensing.

8. The computer program product of claim 5, wherein the architecturally impacting functional requirement classes comprise audit trail, batch processing, localization, communication, payment, print, report, search, third party interaction, workflow, online help and licensing.

* * * * *